United States Patent
Arun

(10) Patent No.: US 8,244,536 B2
(45) Date of Patent: Aug. 14, 2012

(54) ALGORITHM FOR INTELLIGENT SPEECH RECOGNITION

(75) Inventor: Uma Arun, Novi, MI (US)

(73) Assignee: General Motors LLC, Detroit, MI (US)

(*) Notice: Subject to any disclaimer, the term of this patent is extended or adjusted under 35 U.S.C. 154(b) by 2888 days.

(21) Appl. No.: 10/649,439

(22) Filed: Aug. 27, 2003

(65) Prior Publication Data

US 2005/0049859 A1  Mar. 3, 2005

(51) Int. Cl.
*G10L 21/00* (2006.01)
(52) U.S. Cl. .......... 704/270; 704/275; 704/231
(58) Field of Classification Search .......... 704/270, 704/231, 276, 275
See application file for complete search history.

(56) References Cited

U.S. PATENT DOCUMENTS

| | | | |
|---|---|---|---|
| 6,012,030 A * | 1/2000 | French-St. George et al. | 704/275 |
| 6,195,634 B1 * | 2/2001 | Dudemaine et al. | 704/231 |
| 6,882,973 B1 * | 4/2005 | Pickering | 704/270 |
| 2003/0055655 A1 * | 3/2003 | Suominen | 704/276 |

* cited by examiner

*Primary Examiner* — Vijay B Chawan
(74) *Attorney, Agent, or Firm* — Anthony Luke Simon; Reising Ethington P.C.

(57) ABSTRACT

A method for intelligent speech recognition for premature enunciators is disclosed. The method allows for speech recognition systems to adjust to commands of premature enunciators, who speak before the system is ready receive speech input. The method comprises activating the speech recognition system, informing the user that the speech recognition system is ready to receive speech input, and initiating a listening period. The method further comprises receiving input from a user before the system is ready to receive such input, identifying the user as a premature enunciator, and adjusting the system to allow for earlier detection of user speech input.

1 Claim, 2 Drawing Sheets

ALGORITHM FOR INTELLIGENT SPEECH RECOGNITION

FIELD OF THE INVENTION

In general, the invention relates to speech recognition systems. More specifically, the invention relates to a method for intelligent speech recognition.

BACKGROUND OF THE INVENTION

Telematic communication units (TCU's) such as cellular phones, person data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and facsimile messages from virtually anywhere on earth. Such communication can be initiated at the TCU when it is turned on, or by entering a phone number to be called, or in many cases, by speaking a voice command to an automatic speech recognition system (ASR), causing the TCU to automatically complete the process of dialing the number to be called.

A current problem with speech recognition systems is one of premature enunciation by users. Such users of speech recognition systems give voice commands to the speech recognition system before the system is ready to receive the command. A current speech recognition system, after its activation by a user, plays back a prompt stating that it is ready. A short time after the ready prompt, the speech recognition system begins a listening period during which it is able to receive and record commands. However, a considerable amount of users will begin saying commands before the speech recognition system has started the listening period. Such premature enunciators will usually hear a generic error response of "Slower Please" from the speech recognition system, followed by the system replaying the ready prompt. For such users it becomes very annoying and time consuming to listen to the "Slower Please" error message all the time. Thus, there is a significant need for a method and system for improving speech recognition for premature enunciation that overcomes the above disadvantages and shortcomings, as well as other disadvantages.

SUMMARY OF THE INVENTION

One aspect of the invention presents a method for a speech recognition system to adjust to commands of premature enunciators. The method comprises activating the speech recognition system, informing the user that the speech recognition system is ready to receive speech input, and initiating a listening period. The method further comprises receiving input from a user before the system is ready to receive such input, identifying the user as a premature enunciator, and adjusting the system to allow for earlier detection of user speech input.

Another aspect of the invention presents a computer readable medium for a speech recognition system to adjust to premature enunciators. The computer readable medium comprises computer readable code for activating the speech recognition system, informing the user that the speech recognition system is ready to receive speech input, and initiating a listening period. The computer readable medium further comprises computer readable code for receiving input from a user before the system is ready to receive such input and identifying the user as a premature enunciator. The computer readable medium further comprises computer readable code for adjusting the system to allow for earlier detection of user speech input.

Another aspect of the invention provides a system for speech recognition that adjusts to premature commands. The system comprises means for activating the speech recognition system, informing the user that the speech recognition system is ready to receive speech input, and initiating a listening period. The system further comprises means for receiving input from a user before the system is ready to receive such input and identifying the user as a premature enunciator. The system further comprises means for adjusting the system to allow for earlier detection of user speech input.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
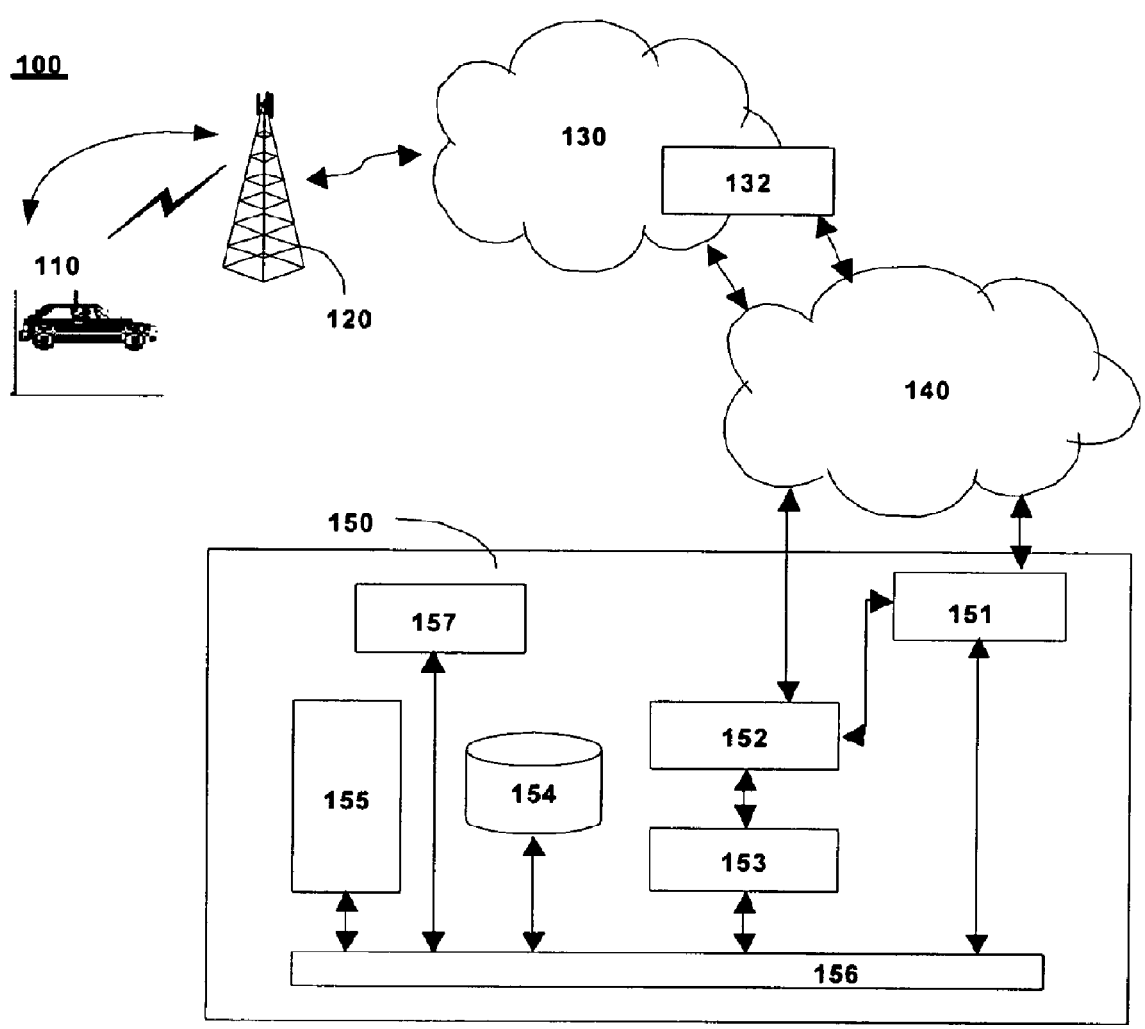
FIG. 1 is a schematic diagram for one embodiment of a system for accessing a speech recognition system using a wireless communication system, in accordance with the current invention.

FIG. 1 shows an illustration of one embodiment of a system for communicating with a mobile vehicle using a wireless communication system in accordance with the present invention, and is also referred to as a mobile vehicle communication system (MVCS) 100. The mobile vehicle communication system 100 may contain one or more mobile vehicles (mobile vehicle communication unit, MVCU) 110, one or more wireless carrier systems (wireless service providers) 120, one or more communication networks 130, one or more short message service centers 132, one or more land networks 140, and one or more call centers 150. One embodiment of the call center 150 contains one or more switches 151, one or more data transmission devices 152, one or more communication services managers 153, one or more communication services databases 154, one or more advisors 155, one or more bus systems 156, and one or more automatic speech recognition (ASR) units 157.

MVCU 110 includes a wireless vehicle communication device (module, MVCS module) such as an analog or digital phone with suitable hardware and software for transmitting and receiving data communications. In one embodiment, MVCU 110 further includes a wireless modem for transmitting and receiving data. In another embodiment, MVCU 110 includes a digital signal processor with software and additional hardware to enable communications with the mobile vehicle and to perform other routine and requested services.

Additionally, MVCU 110 includes a global positioning system (GPS) unit capable of determining synchronized time and a geophysical location of the mobile vehicle. In operation, MVCU 110 sends to and receives radio transmissions from wireless carrier system 120. MVCU 110 is also referred to as a mobile vehicle throughout the discussion below. In operation, MVCU 110 may be implemented as a motor vehicle, a marine vehicle, or as an aircraft.

In a further embodiment, MVCU 110 contains an automatic speech recognition system (ASR) capable of communicating with the wireless vehicle communication device, and contains a speech recognition engine capable of word, phrase, or sentence recognition. An additional embodiment of the module provides the capacity of functioning as any part of, or as all of the above communication devices. In another embodiment of the invention, the module is capable of data storage, and/or data retrieval, and/or receiving, processing, and transmitting data queries.

In yet another embodiment, the MVCS module further includes an audio speaker, a synthesized voice output, an audio channel, or the like. In an example, a MVCS module is implemented, in addition to the receiver, as a set of headphones, the audio portion of a television, a display device, speakers, or the like.

Wireless carrier system 120 is a wireless communications carrier or a mobile telephone system and transmits to and receives signals from one or more MVCU 110. In one example, the mobile telephone system is an analog mobile telephone system operating over a prescribed band nominally at 800 MHz. In another embodiment, the mobile telephone system is a digital mobile telephone system operating over a prescribed band nominally at 800 MHz, 900 MHz, 1900 MHz, or any suitable band capable of carrying mobile communications.

A further embodiment of the MVCS 100 provides the wireless carrier system 120 to be connected with communication network 130. One example of the communication network 130 contains a mobile switching center and provides services from one or more wireless communications companies.

Another embodiment of the MVCS 100 allows for communication network 130 to be any suitable system or collection of systems for connecting wireless carrier system 120 to at least one mobile vehicle 110 or to a call center.

Communication network 130 includes one or more short message service centers 132. Short message service center 132 is capable of prescribing alphanumeric short messages to and from mobile vehicles 110, and includes message entry features, administrative controls, and message transmission capabilities. For one embodiment of the invention, the short message service center 132 includes one or more automated speech recognition (ASR) units. Another example of the short message service center 132 stores and buffers the messages, and includes functional services (short message services) such as paging, text messaging and message waiting notification. An example of the short message services includes telematic services such as broadcast services, time-driven message delivery, autonomous message delivery, and database-driven information services. Another example of the short message services includes message management features, such as message priority levels, service categories, expiration dates, cancellations, and status checks.

A public-switched telephone network is one example of the land network 140, and contains at least one wired network, optical network, fiber network, wireless network, or any combination thereof. Another example of the land network 140 is in communication with an Internet protocol (IP) network. A further example of the land network 140 connects the communication network 130 to a call center. Yet another example of the land network 140 connects a first wireless carrier system 120 with a second wireless carrier system 120, and also connects wireless carrier system 120 to a communication node or call center 150 with the use of the communication network 130. In another embodiment of the invention, a communication system references all or part of the wireless carrier system 120, communication network 130, land network 140, and short message service center 132.

Call center 150 is a location where many calls can be received and serviced at the same time, or where many calls may be sent at the same time. Example call centers are telematic call centers, prescribing communications to and from mobile vehicles 110, voice call centers, providing verbal communications between an advisor in the call center and a subscriber in a mobile vehicle, and voice activated call centers, providing verbal communications between an ASR unit and a subscriber in a mobile vehicle. The call center may contain any combination of hardware or software facilitating data transmissions between call center 150 and mobile vehicle 110. A further embodiment of the invention provides that the call center contains any of the previously described functions.

One embodiment of the call center contains switch 151. Switch 151 is connected to land network 140, and receives a modem signal from an analog modem or from a digital modem. Switch 151 transmits voice or data transmission from the communication node. Another embodiment of switch 151 can receive voice or data transmissions from mobile vehicle 110 through wireless carrier system 120, communication network 130, and land network 140, and can receive from or send data transmissions to data transmission device 152. A further embodiment of switch 151 can receive from or send voice transmissions to advisor 155 via bus system 156. Switch 151 can receive from or send voice transmissions to one or more automated speech recognition (ASR) units 157 via bus system 156.

Data transmission device 152 sends or receives data from switch 151. An example data transmission device 152 is an IP router or a modem. Data transmission device 152 transfers data to or from advisor 155, one or more communication services managers 153, one or more communication services databases 154, one or more automated speech recognition (ASR) units 157, and any other device connected to bus system 156. Another example of data transmission device 152 conveys information received from short message service center 132 in communication network 130 to communication services manager 153.

The communication services manager 153 is connected to switch 151, data transmission device 152, and advisor 155 through bus system 156. Another embodiment of the communication services manager 153 receives information from mobile vehicle 110 through wireless carrier system 120, short message service center 132 in communication network 130, land network 140, and data transmission device 152. Additionally, an embodiment of communication services manager 153 sends information to mobile vehicle 110 through data transmission device 152, land network 140, communication network 130 and wireless carrier system 120. Further embodiments of the communication services manager 153 send short message service messages via short message service center 132 to the mobile vehicle, receive short message service replies from mobile vehicle 110 via short message service center 132, send short message service requests to mobile vehicle 110, and receive from or send voice transmissions to one or more automated speech recognition (ASR) units 157.

Communication services database 154 contains records on one or more mobile vehicles 110, with a portion of communication services database 154 dedicated to short message services. In an example, records in communication services database 154 include vehicle identification, location information, diagnostic information, status information, recent action information, and vehicle passenger (user, customer) and operator (user, customer) defined preset conditions regarding mobile vehicle 110 and any of the communication services. Another embodiment of the invention requires that communication services database 154 provide information and other support to communication services manager 153 and automated speech recognition (ASR) units 157, and to external VRE services.

Examples of advisor 155 are real advisors and virtual advisors. A real advisor is a human being in verbal communication with mobile communication device 110. A virtual advisor is a synthesized voice interface responding to requests from mobile communication device 110. Advisor 155 provides services to mobile communication device 110, and can communicate with communication services manager 153, automated speech recognition (ASR) units 157, or any other device connected to bus system 156 or mobile communication device 110. Another embodiment of the invention allows for the advisor 155 and ASR units 157 to be integrated as a single unit capable of any features described for either.

Figure 2:
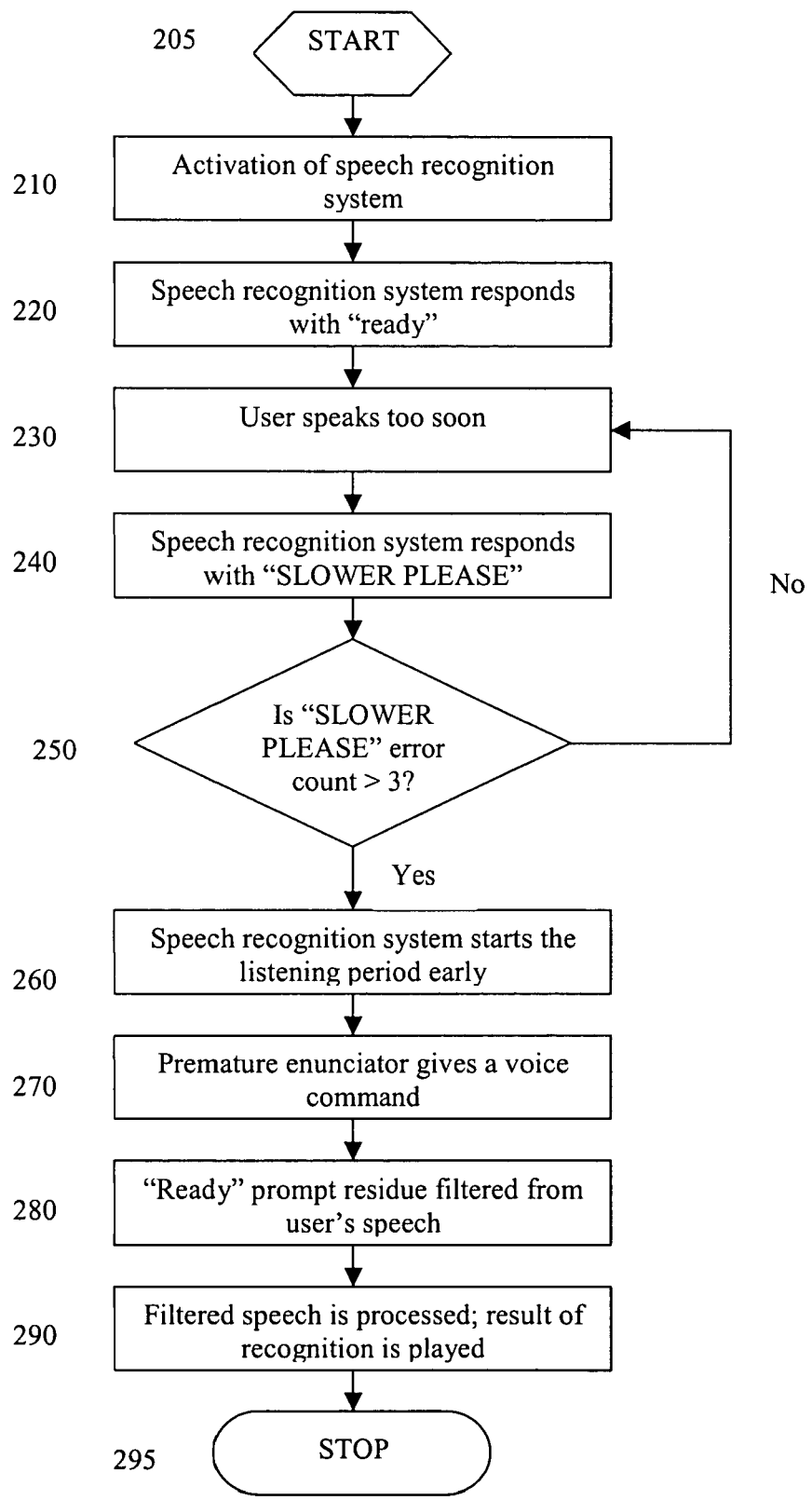
FIG. 2 is a flowchart outlining one embodiment of a method for a speech recognition system to adjust to premature enunciator commands utilizing the system of FIG. 1 in accordance with the instant invention.

FIG. 2 is a flowchart outlining one embodiment of a method for a speech recognition system to adjust to premature enunciator commands in accordance with the present invention. The method begins at block 205. A speech recognition system embedded in the MVCU receives an initiation sequence from the user, at block 210, to activate the speech recognition system. This may be done by pressing a speech recognition activation button on the speech recognition system, or by turning the car's ignition to the on position. In one embodiment, the user presses the "voice" button to activate the system. In another embodiment, the speech recognition system turns on when the user starts the vehicle. The speech recognition system then acknowledges that it is ready to receive speech input at block 220. This may be done by the speech recognition system playing back a recording prompt of "ready", or turning on a light indicator, or another audible feedback, including a beep.

Following a first predetermined time period, after the system gives the ready response, the speech recognition system begins listening for user speech input. In one embodiment, this first delay is 25-200 ms, but the first time delay may be any predetermined time delay. If the user begins speaking before the speech recognition system is ready to receive speech input, then the speech recognition system determines that the user has talked prematurely at block 230. This occurs if the user speaks before the first time delay after the "ready" playback has expired, or if the user speaks before the playback of "ready" is finished. The speech recognition system then outputs an error associated with a premature enunciator and advises the user at block 240 to begin speaking the command later. In one embodiment, this is done by the speech recognition system playing back a "Slower Please" response. The speech recognition system then checks at block 250 whether the error count, associated with the user talking too soon, exceeds a predetermined number. In the present embodiment, this predetermined number of errors is 3. If the error count is not exceeded then the speech recognition system returns to block 230 and again informs the user that it is ready. The user then again inputs the voice command and follows the sequence of blocks to block 250. If the number of errors does exceed the predetermined number at block 250, then the speech recognition system enters a premature enunciator mode and proceeds to block 260. In premature enunciator mode, the ASR begins a second listening period at a second time. In one embodiment, the second time is shorter than the first delay. In one embodiment, the second listening period begins prior to the system finishing the "slower please" response. In the present embodiment, this interval is 50 to 100 ms before the "ready" prompt playback is finished. The premature enunciator user then gives the voice command again to the speech recognition system, at block 270.

The speech recognition system now receives the full command, as a result of its earlier listening time, and filters unnecessary noise residue from the voice command at block 280. In the present embodiment, this residue may be the entire or part of the overlaying "ready" playback prompt. Filtering the noise residue may be accomplished in any one of a number of ways, as is well known in the art. The speech recognition system then processes the filtered voice command at block 290 and plays back a response to the user's command. The speech recognition system may process the command internally or send the command through the carrier system 120. This type of response is known as the "result of recognition." The system then stops and waits for the next user command at block 295. In one embodiment, the system remains in the premature enunciator mode until the speech recognition system is turned off. In another embodiment, the speech recognition system resets the premature enunciator mode to its normal mode of operation with the regular listening period interval of 50 ms as soon as the first command is processed at block 295. In another embodiment, the system may reset to a default mode from premature enunciator mode when the vehicle ignition is turned off. In another example, the system remains in premature enunciator mode until specifically reset by a user regardless of ignition. If the reset is user controlled, means for resetting the system are provided. The means for resetting the system may comprise a reset button, or other system known to those of skill in the art.

The above-described methods and implementation for intelligent speech detection and associated information are example methods and implementations. These methods and implementations illustrate one possible approach for providing detection of premature enunciators, and adjusting the speech recognition system in a meaningful way so as to improve customer satisfaction and service. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

What is claimed is:

1. A method for a speech recognition system to adjust to premature enunciator commands, the method comprising:
   activating the speech recognition system;
   receiving speech input from a user before the system is ready to receive speech input;
   determining that the user has spoken prematurely; and
   adjusting the system after determining that the user has spoken prematurely to allow for earlier detection of user speech input;
   wherein the method further comprises the speech recognition system providing a prompt indicating that the system is ready to receive speech input, receiving the user speech input before the system has started a first listening period that begins after a delay following the prompt, and thereafter providing a subsequent prompt and starting a subsequent listening period at an earlier time relative to its prompt.

* * * * *